(12) United States Patent
Baldwin et al.

(10) Patent No.: US 10,568,065 B2
(45) Date of Patent: Feb. 18, 2020

(54) SYSTEM AND METHOD FOR SMALL CELL BASED AUGMENTED REALITY

(71) Applicant: AT&T Intellectual Property I, L.P., Atlanta, GA (US)

(72) Inventors: Christopher Baldwin, Algonquin, IL (US); Michael Towster, Barrington, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/794,466

(22) Filed: Oct. 26, 2017

(65) Prior Publication Data

US 2018/0049155 A1    Feb. 15, 2018

Related U.S. Application Data

(63) Continuation of application No. 15/234,535, filed on Aug. 11, 2016, now Pat. No. 9,838,995, which is a
(Continued)

(51) Int. Cl.
*H04M 3/42* (2006.01)
*H04W 64/00* (2009.01)
(Continued)

(52) U.S. Cl.
CPC ......... *H04W 64/006* (2013.01); *G06T 19/006* (2013.01); *H04W 4/024* (2018.02); *H04W 4/029* (2018.02); *H04W 4/16* (2013.01)

(58) Field of Classification Search
CPC .. H04L 29/08657; H04W 4/02; H04W 4/024; H04W 4/029; H04W 4/025;
(Continued)

(56) References Cited

U.S. PATENT DOCUMENTS 6,150,943 A    11/2000  Lehman et al.
6,865,538 B2 *  3/2005  Chithambaram ...... G06Q 50/01
                                                 705/1.1
(Continued)

FOREIGN PATENT DOCUMENTS

EP    0354120 A1    2/1990
EP    0568238 B1    3/1993
(Continued)

OTHER PUBLICATIONS

"NaviBeam: Indoor Assistance and Navigation for Shopping Malls Through Projector Phones"; Christian Winker, et al.; CHI 2011 Workshop on Mobile and Personal Projection, 2011.
(Continued)

*Primary Examiner* — Shantell L Heiber (57) ABSTRACT

Information such as navigation information is delivered to a mobile device user in a cellular communications network via a device other than the mobile device. A small cell telecommunications base station receives from the mobile device an identification of the mobile device, and determines a location of the user within the small cell. Based on the identification of the mobile device and the location of the user of the mobile device, the information is delivered to the user via a device other than the mobile device.

20 Claims, 4 Drawing Sheets

Related U.S. Application Data continuation of application No. 14/077,757, filed on Nov. 12, 2013, now Pat. No. 9,473,913.

(51) Int. Cl.
*H04W 4/16* (2009.01)
*H04W 4/024* (2018.01)
*H04W 4/029* (2018.01)
*G06T 19/00* (2011.01)

(58) Field of Classification Search
CPC .............. B63B 2213/00; Y02T 90/161; G08G 1/096805; G01C 21/362; G02B 27/01
See application file for complete search history.

(56) References Cited

U.S. PATENT DOCUMENTS

| | | |
|---|---|---|
| 7,292,269 B2 | 11/2007 | Raskar et al. |
| 7,377,650 B2 | 5/2008 | Simon |
| 7,797,642 B1* | 9/2010 | Karam ................ G06Q 10/107 345/419 |
| 8,244,403 B2 | 8/2012 | Lin et al. |
| 8,346,279 B1 | 1/2013 | Saaatchi |
| 8,395,968 B2 | 3/2013 | Vartanian et al. |
| 8,401,915 B1 | 3/2013 | Kim |
| 8,446,288 B2 | 5/2013 | Mizushima et al. |
| 8,624,725 B1* | 1/2014 | MacGregor ........... H04W 4/029 340/539.13 |
| 8,755,738 B2 | 6/2014 | Forutanpour |
| 9,417,312 B2 | 8/2016 | Velusamy |
| 2004/0260459 A1* | 12/2004 | Kato ...................... G01C 21/20 701/428 |
| 2005/0245191 A1 | 11/2005 | Falcon |
| 2006/0158740 A1* | 7/2006 | Stoschek ............... B60K 35/00 359/630 |
| 2007/0202887 A1 | 8/2007 | Counts |
| 2008/0280624 A1 | 11/2008 | Wrappe |
| 2010/0053100 A1* | 3/2010 | Lin ....................... B60K 35/00 345/173 |
| 2010/0161207 A1* | 6/2010 | Do ........................ G01C 21/36 701/532 |
| 2010/0278379 A1 | 11/2010 | Rothschild |
| 2011/0040628 A1 | 2/2011 | Kido |
| 2011/0077026 A1 | 3/2011 | Cousins |
| 2012/0064865 A1* | 3/2012 | Choi ..................... H04W 4/046 455/414.1 |
| 2012/0092183 A1 | 4/2012 | Corbett et al. |
| 2012/0302261 A1 | 11/2012 | Tinnakornsrisuphap |
| 2012/0320033 A1 | 12/2012 | Papaefstathiou et al. |
| 2013/0010068 A1 | 1/2013 | Tiernan et al. |
| 2013/0050206 A1 | 2/2013 | Willis et al. |
| 2013/0076789 A1 | 3/2013 | Majumder et al. |
| 2013/0080204 A1* | 3/2013 | Khorashadi .......... G06Q 10/109 705/7.19 |
| 2013/0162521 A1 | 6/2013 | Lee et al. |
| 2013/0222426 A1 | 8/2013 | Hymel |
| 2013/0222427 A1 | 8/2013 | Heo et al. |
| 2013/0316689 A1* | 11/2013 | Iwasaki ................... H04L 67/14 455/418 |
| 2014/0074873 A1* | 3/2014 | Ngo .................. G06F 17/30241 707/758 |
| 2014/0094200 A1 | 4/2014 | Schatzberg |
| 2014/0115631 A1 | 4/2014 | Mak |
| 2014/0179230 A1* | 6/2014 | Sydir ..................... H04W 4/025 455/41.2 |
| 2014/0358438 A1* | 12/2014 | Cerny ..................... G01C 21/00 701/537 |
| 2015/0004969 A1 | 1/2015 | Han |
| 2015/0066360 A1* | 3/2015 | Kirsch ............... G01C 21/3688 701/438 |

FOREIGN PATENT DOCUMENTS

| | | |
|---|---|---|
| WO | WO2012177194 A1 | 12/2012 |
| WO | WO2013126784 A2 | 8/2013 |

OTHER PUBLICATIONS

"Pathlight: Group Navigation in a Museum Using a Personal Projector"; Alan J. Wecker, et al.; Workshop on Mobile and Personal Projection 2011.

"Guiding Light: Navigation Assistance System Using Projection Based Augmented Reality"; Jaewoo Chung, et al.; Consumer Electronics (ICCE) 2011 IEEE International Conference on, IEEE, 2011.

"The Everywhere Displays Projector: A Device to Create Ubiquitous Graphical Interfaces"; Claudio Pinhanez; Ubicomp 2001; Ubiquitous Computing, Springer Berlin Heidelberg, 2001.

"AT&T 3GMicroCell" http://www.att.com/standalone/3gmicrocell/?fbid=R0aK3UUhYv7; 2013.

* cited by examiner

SYSTEM AND METHOD FOR SMALL CELL BASED AUGMENTED REALITY

CROSS REFERENCE TO RELATED APPLICATIONS

This application is a continuation of co-pending U.S. patent application Ser. No. 15/234,535, entitled "SYSTEM AND METHOD FOR SMALL CELL BASED AUGMENTED REALITY," filed on Aug. 11, 2106, now U.S. Pat. No. 9,838,995 issued on Dec. 5, 2016, which is a continuation of U.S. patent application Ser. No. 14/077,757, entitled "SYSTEM AND METHOD FOR SMALL CELL BASED AUGMENTED REALITY," filed on Nov. 12, 2013, now U.S. Pat. No. 9,473,913 issued on Oct. 18, 2016, the disclosures of which are incorporated herein by reference in their entirety.

TECHNICAL FIELD

The present disclosure relates to augmented reality systems. More specifically, the disclosure is directed to providing an augmented reality system by enabling small telecommunications cells to deliver information directly to a user independently of a mobile device.

BACKGROUND

Current methods of creating augmented reality often restrict operation to mobile devices. That restriction forces the user to view the world through a small display. Not only does this hurt the user experience, it can also take the focus of a user away from potential hazards just out of view of the camera lens.

The use of a mobile device display for presenting augmented reality scenes also limits the usefulness of such augmented reality systems for groups. While each member of a group may have an individual mobile device with the same information displayed, he or she is restricted (in most cases) to the device, making the group more a collection of individuals than a group in some respects.

SUMMARY

In an exemplary embodiment of the present disclosure, there is provided a method for delivering information to a user of a mobile device. A small cell telecommunications base station in a cellular telecommunications network receives from the mobile device an identification of the mobile device via a low-range cellular communications transceiver. A location of a user of the mobile device within a cellular coverage area of the small cell telecommunications base station is then determined. Based on the identification of the mobile device and the location of the user of the mobile device, the cellular telecommunications network delivers information to the user of the mobile device via a device other than the mobile device.

The information delivered to the user may be navigation information, in which case the device other than the mobile device may be a projector in communication with the small cell telecommunications base station and positioned to project navigation indicia on surfaces visible to the user.

The information delivered to the user may be communicated to the device other than the mobile device by a second small cell telecommunications base station.

Determining a location of the user of the mobile device within the cellular coverage area of the small cell telecommunications base station may further comprise interpreting images received from at least one camera positioned within the cellular coverage area of the small cell telecommunications base station. Alternatively, determining the location may further comprise receiving location data determined by a GPS receiver located in the mobile device. Determining the location may be based on a signal strength of a signal received by the small cell telecommunications base station from the mobile device.

The information delivered to the user may be product sales information relating to a target product in view of the user. The device other than the mobile device may be an audio system.

The method may further include, based on the identification of the mobile device and the location of the user of the mobile device, querying a Web resource for the information via a cellular base station backhaul connecting the small cell telecommunications base station to a wide area network; and receiving the information from the Web resource via the cellular base station backhaul.

The method may additionally comprise receiving customization information from the user via a mobile app running on the mobile device.

Another aspect of the disclosure is a small cell telecommunications base station for use in an augmented reality system. The small cell telecommunications base station comprises a processor, a backhaul interface in communication with the processor and configured for communicating with a cellular telecommunications network, and a low-range cellular telecommunications transceiver in communication with the processor and configured for communicating with a mobile device within the cellular telecommunications network. The small cell telecommunications base station further comprises a memory device having stored thereon computer readable instructions that, when executed by the processor, cause the processor to perform operations including receiving via the low-range cellular telecommunications transceiver an identification of the mobile device; determining a location of a user of the mobile device within a coverage area of the low-range cellular telecommunications transceiver; and, based on the identification of the mobile device and the location of the user of the mobile device, delivering information to the user of the mobile device via an information delivery device other than the mobile device.

Another aspect of the disclosure is a tangible computer-readable medium having stored thereon computer readable instructions for delivering information to a user of a mobile device, wherein execution of the computer readable instructions by a processor causes the processor to perform the operations set forth above.

DETAILED DESCRIPTION

Small cellular base stations, or small cells, in cellular telecommunications networks are increasingly being used to handle locally dense mobile device usage and to fill coverage gaps. Locally dense phone and data usage is often associated with public events such as sports events and concerts, and small cells are often used in venues where such events are hosted. Coverage gaps may be the result of the geometry and spacing of cellular base stations in a network, or may result from natural or man-made obstructions or interferences to wireless communications. For example, a small cell may be used inside a building where cell coverage is poor, such as in a mall, a hotel, or a transportation hub.

A small cell is served by a low power cellular base station, covering a limited area. Power control is typically used to limit the radius of the coverage area.

While standard base stations may have ranges of up to 35 kilometres (22 mi), small cells typically cover a radius of less than two kilometers, depending on their application. Products are available having a range of 200 meters or less. Base stations having a range of about 20 meters or less are sometimes called "femtocells." One example, the AT&T 3G MicroCell™, available from AT&T Corp., has a range of about 12 meters and is typically used to improve cellular reception in a home or a small business.

Mobile devices or "smart phones" may be used to present augmented reality by overlaying information on images as captured by a mobile device camera in real time. This can be used for guiding users to destinations with colored lines representing the path on the mobile device display or providing information about a location such as historical information or reviews. This requires that the user see this information through the lens of his or her mobile device, which has its own obvious issues.

A mobile device, as that term is used in this disclosure, is a device capable of voice and data communications within a cellular radio communications network. Typically, a mobile device transmits and receives data using multiplexing and access schemes such as Global System for Mobile Communications (GSM), code division multiple access (CDMA) or Advanced Mobile Phone System (AMPS). The mobile device additionally has on-board processing capability that is used in executed various applications running on the device.

Small cells, in addition to adding capacity and filling coverage gaps, have the potential to change the way people interact with a cellular network. Presently disclosed is a system and method for enabling small cells to provide information to the user directly, rather than through a mobile device. This disclosure proposes configuring a small cell to create a sort of augmented reality by overlaying information on the real world rather than sending it to a user through a mobile device. The proposed system includes at least two subsystems: (1) a user identification and tracking system, and (2) a target identification or information delivery system. The user identification and tracking system uses cameras and/or location information from the mobile device (and possibly other methods) to identify a user and to track his or her position/movement through a space.

Depending on the function to be performed by the system (e.g. navigation), the second subsystem, the target identification system, takes the location and identification information and, based on that information, identifies to the user a corresponding location (and/or object). The target identification system may project colored light, images, video, etc. indicating the target to the user or otherwise providing relevant information to the user. For example, if the system is performing a navigation function, the cell may provide visual indicators to the user such as projected lines or arrows on the ground, walls, or other objects. The small cell may use auditory signals as well under certain circumstances.

The indicators delivered by the target identification system may not always come from the small cell currently serving the user mobile device. For example, it is possible for a user to be on one cell while a different cell provides navigation indicators visible to the user. That coordinated effort is also managed by the target identification system.

The target identification system may function as an emergency system to identify paths to emergency shelters, emergency services, or away from hazards/threats. Current emergency data may be delivered to the small cell via a connection with the Internet or a dedicated emergency network.

User profiles may be used to customize the appearance and types of indicators and information. The user profiles may be part of a profile stored in connection with the cellular network service and subscription associated with a mobile device or a user. Alternatively, users may enable mobile apps on their mobile devices to control the experience for them.

Figure 1:
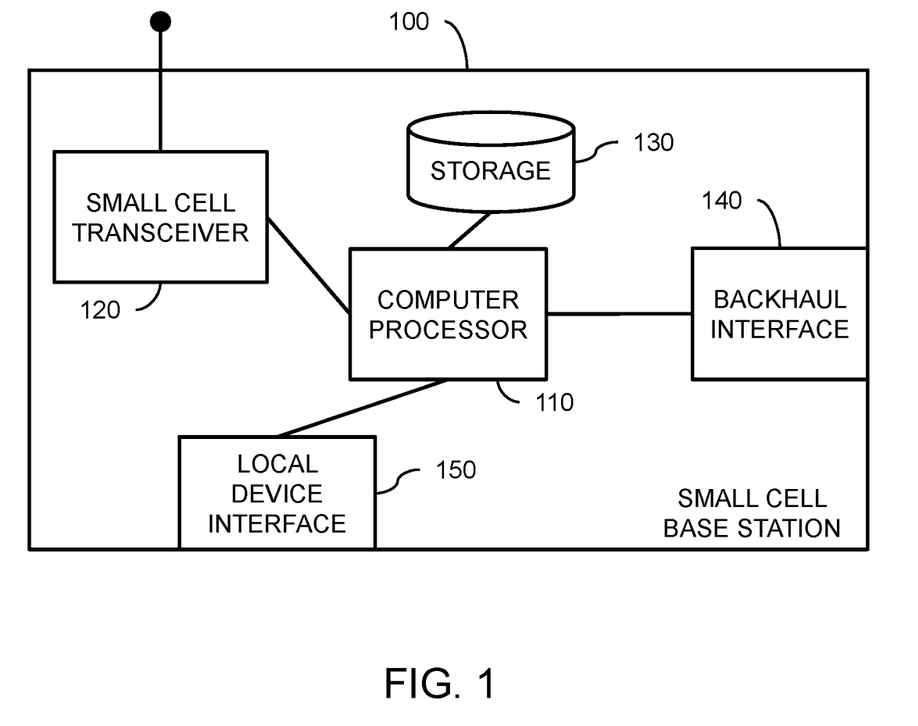
FIG. 1 is a schematic diagram illustrating the overall architecture of a small cell base station according to one aspect the present disclosure.

A small cell base station 100 in accordance with one embodiment of the disclosure is shown in FIG. 1. A computer processor 110 performs operations for delivering augmented reality information to a user in accordance with the present disclosure. The processor may be a single central processing unit (CPU) integrated circuit (IC) or a group of ICs integrated into the base station. The processor may alternatively be part of a mainframe computer, a desktop or a laptop computer or any other device or group of devices configured for performing operations in accordance with the present disclosure. The functions of the processor 110 may, in whole or in part, be performed using a distributed or cloud computing capability provided to the small cell base station 100, where tasks are performed by remote processing devices that are linked through a communications network.

A computer storage device or memory 130 contains information available to the processor 110. The storage 130 may include a random access memory (RAM) and a non-volatile computer-readable media or non-volatile memory such as an electrically erasable programmable read-only memory (EEPROM). The memory may also include removable media such as a disk drive, tape drive, memory card, etc., or a combination thereof.

Generally, the processor 110 is configured with program modules that include routines, objects, components, data structures and the like that perform particular tasks or implement particular abstract data types. The term "program" as used herein may connote a single program module or multiple program modules acting in concert. In a distributed computing environment, program modules may be located in both local and remote memory storage devices.

The program modules for implementing the disclosed methodology are read into a main memory of the processor 110 or a plurality of processors from the storage 130. In the case of a program stored in a memory media, execution of sequences of instructions in the module causes the processor to perform the process operations described herein. The embodiments of the present disclosure are not limited to any specific combination of hardware and software and the computer program code required to implement the foregoing can be developed by a person of ordinary skill in the art.

The processor 110 may execute only portions of the methodology described herein; with other portions of the methodology being executed by other processors located outside the small cell base station 100. For example, certain operations may be performed by processors located elsewhere within a cellular communications network, or by processors connected to the small cell base station via a wide area network such as the Internet.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a tangible and non-transitory computer-readable medium. Common expedients of computer-readable media are well-known and need not be described in detail here.

The processor 110 is connected to a cellular telecommunications network via a backhaul interface 140. The backhaul may be a wired backhaul connecting the small cell base station 100 directly to a mobile switching center in a manner similar to that used for standard cellular base stations. The backhaul may alternately connect via wire or fiber through a broadband wide area network connection to the cellular telecommunications network. In another embodiment, the backhaul may connect via a short range wireless connection such as an 802.11x connection to the cellular telecommunications network, either directly or through a wide area network.

A small cell radio transceiver 120 sends and receives radio communications with mobile devices within range. The small cell transceiver may utilize the same transmission and multiplexing techniques used by the local cellular communications services, such as GSM, CDMA or AMPS.

In cooperation with the processor 110, the small cell transceiver 120 may participate in cellular communications handovers within a local cellular network, wherein an ongoing call or data session is transferred from one channel connected to the core network to another channel. Handovers typically take place when a mobile device physically moves from one cellular coverage area to another. Handovers may be from one small cell to another small cell within a cellular subnetwork covering a building, a transportation system, a park, a museum or another coverage area. Handovers may also take place between the small cell base station 100 and a standard telecommunications cell covering an area overlapping with the coverage of the small cell.

As noted above, the small cell transceiver 120 is limited in range by limitations on its radio broadcast power. For example, the transceiver may have a range less than 200 meters. In another aspect of the disclosure, the transceiver 120 may have a range of less than 20 meters.

The small cell base station also includes one or more local device interfaces 150 for communicating with devices situated within or near the coverage area of the small cell transceiver 120. The devices are used in communicating with the user via means other than a mobile communications device. The devices may include sensors, projectors, lights, display screens, and other devices capable of directly delivering or receiving communications with a mobile device user within the range of the small cell base station, without using the mobile device as the information delivery or transmitting mechanism.

The local device interface 150 may utilize a wired or a wireless connection with a device, or may utilize a connection with a wide or local area network such as the Internet to address a particular device that is also connected to the wide or local area network.

Figure 2:
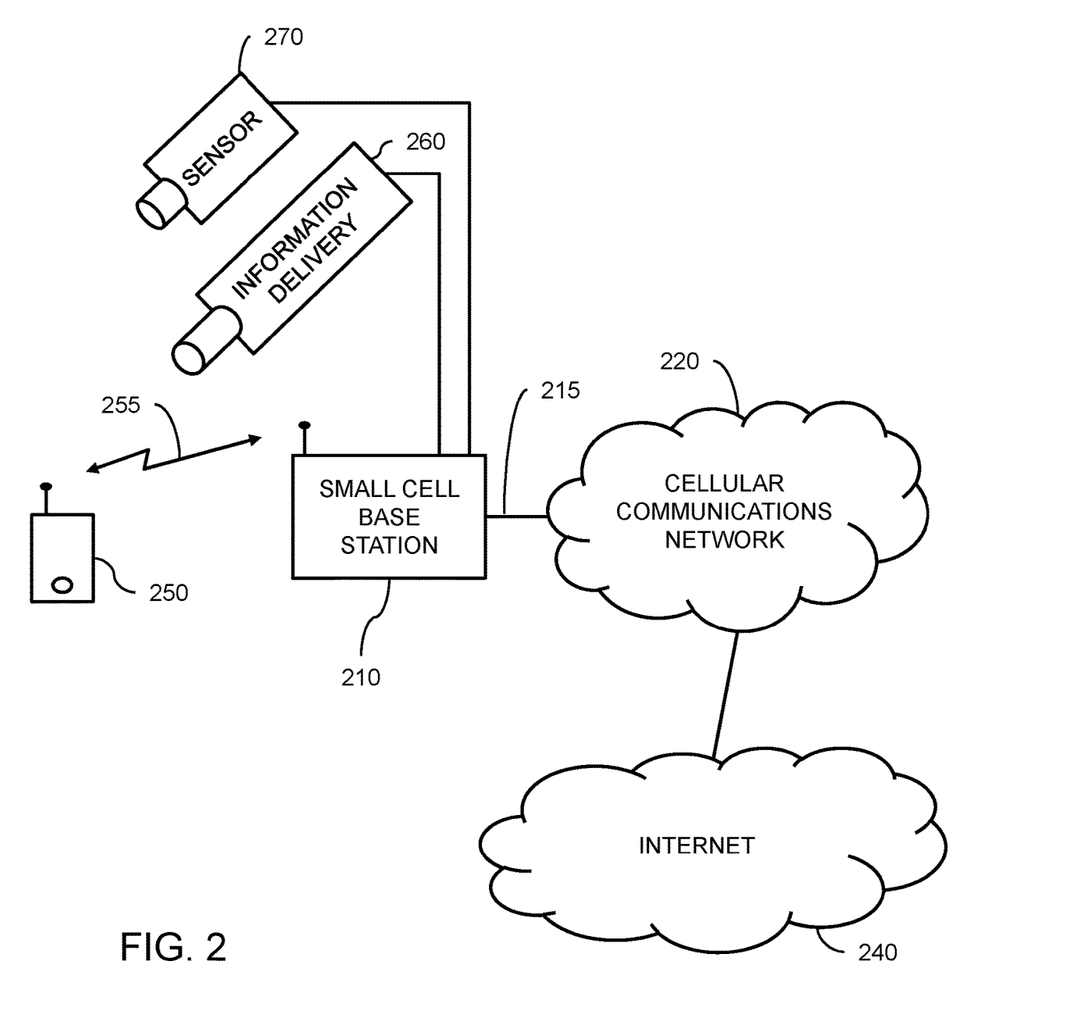
FIG. 2 is a schematic diagram showing an information delivery system according to one aspect the present disclosure.

An example information delivery system according to the present disclosure is shown in FIG. 2. A small cell base station 210 communicates via a radio connection 255 with a mobile device 250. The connection 255 may utilize transmission and multiplexing techniques such as GSM, CDMA or AMPS. Communications between the small cell base station 210 and the mobile device 250 may be initiated by a cell-to-cell handoff from another cell, or may be initiated by the mobile device through a mobile app sign-on or other means.

The small cell base station 210 communicates with a mobile switching center (not shown) or another node within a cellular communications network 220. The network 220 is capable of routing packets from the small cell base station 210 to a wide area data networks such as the Internet 240. In the configuration shown in FIG. 2, communications between the small cell base station 210 and the cellular communications network 220 are transmitted via a telecommunications backhaul 215. In other configurations, the small cell base station may communicate via a broadband data connection (not shown), through the Internet 240 to the cellular communications network 220. In either case, the cellular communications network 220 receives and processes voice and data transmissions from the mobile device 250, and handles handoffs between the small cell base station 210 and other base stations within the network.

Mobile device identity information may be transmitted via the radio connection 255 to the base station, providing a unique identity of the mobile device 250 or of the user. For example, the mobile device may be identified using an International Mobile Station Equipment Identity (IMEI) number assigned to the device, or a user may be identified by a subscriber identity module (SIM) installed in the mobile device to identify and authenticate the subscriber.

Also transmitted from the mobile device to the small cell base station are commands initiated by the user, such as queries or requests to provide information. The queries or requests are directed to the software module or modules performing the presently disclosed methodology. The queries or requests may be initiated using a mobile app installed on the mobile device.

Additionally, location information about the device 250 may be determined by the device and transmitted to the base station 210 via the radio connection 255. For example, many mobile devices are equipped with a global positioning system (GPS) receiver and processor for using satellite signals to determine geographic position. Alternatively, position information about the mobile device 250 may be determined by the cellular communications network 220 using triangulation techniques to process signal strengths received by one or more base stations.

A sensor 270 may be connected to the base station 210 to measure or refine information about the user of the mobile communications device. In addition to transmitting information from the sensor 270 to the small cell base station 210, the connection between those two elements may also provide power to the sensor.

In one embodiment of the disclosure, the sensor is a camera providing a video feed to the base station 210. The base station 210, or another node in the cellular communications network 220 or the Internet 240, interprets images in the video feed in order to determine a location and orientation of the user of the mobile device. Interpretation of the images may be done in conjunction with the position and identity information discussed above, to distinguish the user in a video feed containing images of multiple people, or to refine coordinates. Video information may additionally be employed to gather a wide variety of information, such as a tour group size, a shelf stocking status in a store, etc.

In addition to determining location coordinates, a camera may be used to determine a direction or orientation of a user. For example, a system may determine which way a user's head is turned, and deliver information such as navigation directions on surfaces within the field of view of the user. The camera may also be used to identify a user based on facial recognition or clothing. The camera may collect information about a user's surroundings, including the identification of appropriate surfaces on which to project information. Information collected by cameras, including video feeds, may be scrubbed to remove identifying features before sharing that information with other computer systems. For example, if the mobile device user is in a crowd of people, identifying features or images of other people captured in the video may be removed before sharing the images with third party systems.

Other types of sensors 270 may also be used. For example, temperature, water level and smoke sensors may be used in systems providing emergency information to users. Microphones may be used to captures audio data. Sensors in floors or furniture may be used to precisely locate users, An information delivery device 260 is also connected to the base station 210. The information delivery device is a device separate from the mobile device 250 and communicates information directly to the user. In one example, the information delivery device is a projector that is used to project guidance indicia, such as lines and arrows, on surfaces that are visible to the user. The guidance indicia may assist the user in navigating through an environment such as a building. Such guidance indicia may be used in a hospital, a museum, an amusement park, an office building or any other facility where visitors often need help in navigation.

The disclosed system may alternatively provide navigation information to guide a user to another person, to an item in a store, or to another moveable destination. In that case, the system uses additional information collected via sensors or collected from other networks to determine a destination location. In the case of guiding a mobile device user to another mobile device user, location information from both mobile devices, received by different small cell base stations, may be used in planning a route. Both users may then be guided to a meeting point via projected indicia controlled by multiple small cell base stations.

The information delivery device may alternatively be an audio system that is used, for example, to provide spoken guidance or other information to the user. Other types of information delivery devices include, but are not limited to, video display devices, laser pointers, illumination lights, etc.

The information delivery device may be configured to provide information to a particular user without being observable to others. For example, polarized projections may be used in conjunction with polarized viewing lenses to prevent projected navigation instructions from confusing people other than the intended user. Further, personal information may be displayed using such a technique without making that information available to others in the same location.

In addition to navigation information, the information delivery device may be used to deliver a broad range of other information types. Explanatory or background information may be delivered as text projected on a surface near an item of interest. For example, price, size and other information about an item on a store shelf may be displayed near the item, based on a determination by the system that the user is located near the item, or based on a determination of user orientation that indicates that the user is looking at that item.

In a clothes shopping environment, an image of an item of clothing or accessory may be projected directly on a potential buyer, reducing the need to try on an item. A mobile app may maintain a virtual inventory of clothing or accessories owned by the user, and project images of those items on demand. For example, an image of a tie owned by a user may be projected on a shirt the user is considering buying.

Figure 3:
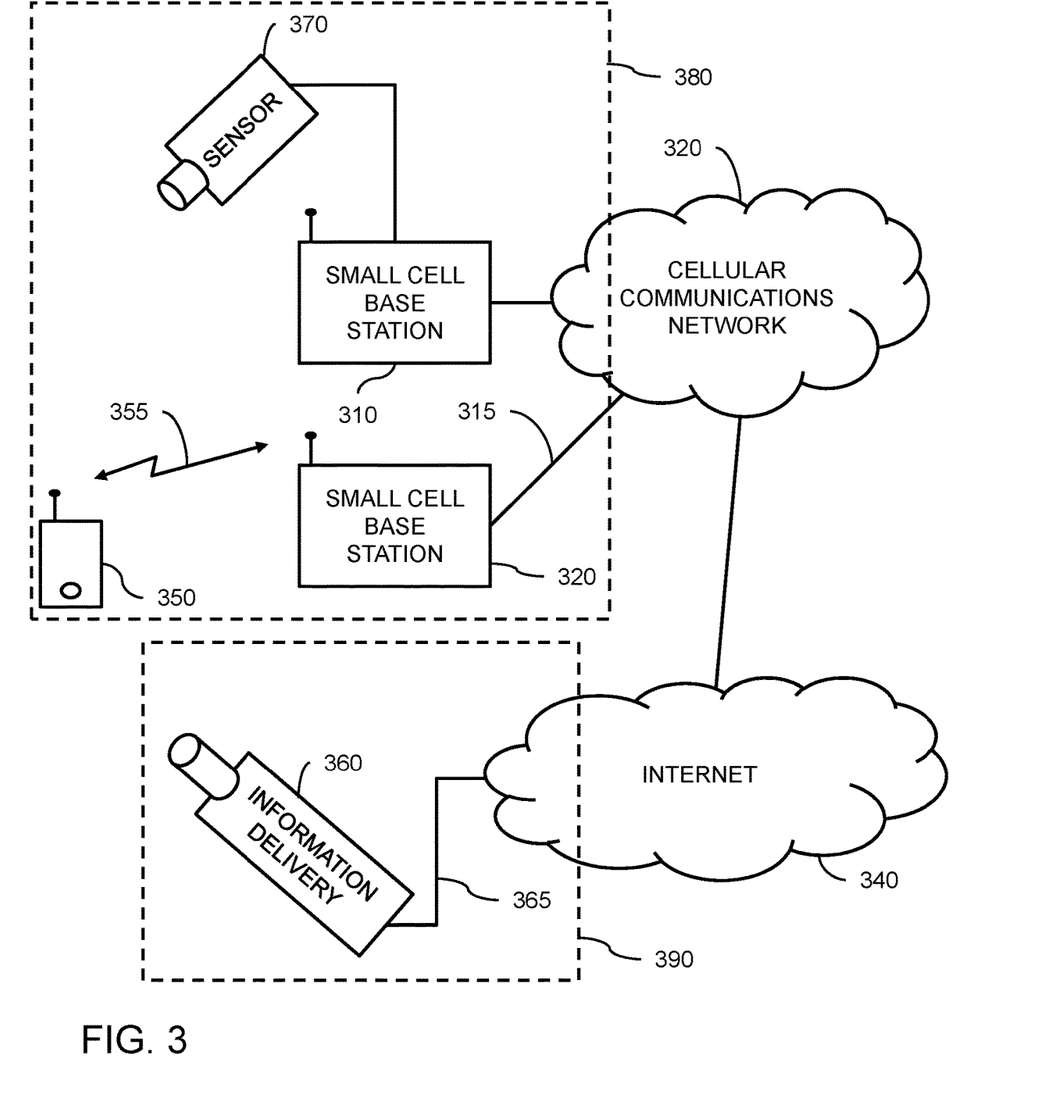
FIG. 3 is a schematic diagram showing an information delivery system according to another aspect the present disclosure.

In an alternative system configuration, shown in FIG. 3, a mobile device 350 communicates with a small cell base station 320 via a radio channel 355. The small cell base station 320 is connected to a cellular communications network 320 via a backhaul 315. The cellular communications network 320 communicates with a wide area network such as the Internet 340.

In the illustrated embodiment, the sensor 370 is connected to a second small cell base station 310, which is also connected to the cellular communications network 320. Information from the sensor 370 is coordinated with information from the mobile device 350 by one or more software modules executing the presently described methodology. Such a configuration may be used, for example, in cases where the second small cell base station is located near the sensor, or where the second small cell base station has communications or processing capabilities needed to control the sensor.

The illustrated embodiment also includes an information delivery device 360 connected to the Internet 340 via a router (not shown) and broadband connection 365. One or more program modules for providing the disclosed information delivery service may be instantiated in one of the small cell base stations 310, 320, or elsewhere in the cellular communications network 320, or on a server connected through the Internet 340. The program modules receive information from the mobile device 350 and optionally from the sensor 370, and control delivery of information to a user via commands transmitted to the information delivery device 360.

As noted above, functionality within the system may be divided into two subsystems: a user identification and tracking system and a target identification or information delivery system. An exemplary user identification and tracking system 380 and a target identification or information delivery system 390 are represented by the dashed lines included in FIG. 3. The two subsystems may include separate program modules executing on separate processors that exchange information via network connections. Alternatively, the two subsystems may be instantiated by a single program module executing within a single network node such as the small cell base station 210 shown in FIG. 2.

Figure 4:
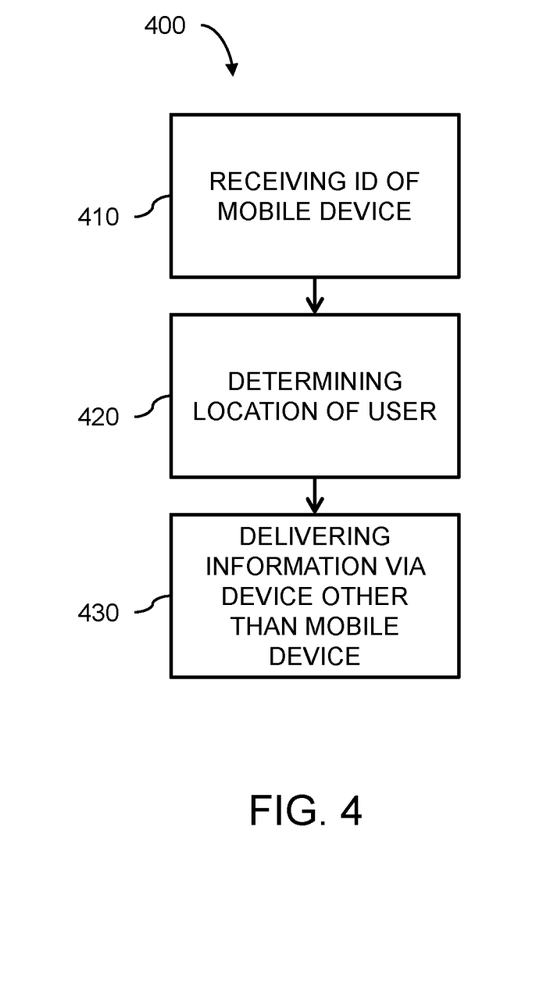
FIG. 4 is a block diagram showing a method according to one aspect the present disclosure.

An example method 400 in accordance with the present disclosure is illustrated by the block diagram of FIG. 4. In block 410, an identification of the mobile device is received by a small cell telecommunications base station in a cellular telecommunications network. The reception is via a low-range cellular communications transceiver. In one embodiment, the identification is part of the handoff or login exchange automatically performed by the mobile device in initiating communications with the base station. Alternatively, the identification information may be transmitted under control of a mobile app running on the mobile device specifically for purposes of the presently disclosed information delivery methodology.

A location of a user of the mobile device is determined at block 420. The location may be a geographic location within a cellular coverage area of the small cell telecommunications base station. Location information may be determined using a sensor such as a camera, or may be determined by the cellular communications network using GPS information from the mobile device, signal strength triangulation, or any combination of these or other means. In the case where the location of the user is determined by the cellular communications network based on GPS or signal strength triangulation, the location of the mobile device is used as an indicator of the location of the user The cellular telecommunications network delivers, at block 430, information to the user of the mobile device via a device other than the mobile device. The particular information is determined based on the identification of the mobile device and the location of the user of the mobile device.

The disclosure encompasses a broad range of embodiments. For example, a mobile app installed on a mobile device may provide a list of featured displays in a museum. A user indicates via the app that she wishes to be guided to a particular featured display. A software module having access to information from the cellular communications network then uses location and identification information transmitted by the mobile device, together with video information from a sensor, to determine the precise location of the mobile device user in the museum. The software module then determines a best route to be taken by the user to the featured display, and guides her there by projecting guidance indicia on surfaces visible to the user. The guidance indicia can be seen by the user without resorting to viewing the screen of the mobile device. The guidance indicia are additionally visible to other members of the group with which the user is visiting the museum.

In a large museum, several small cell base stations may be used to provide adequate cellular coverage on all floors and all wings of the museum. The cells execute connection handoffs as the user moves from one coverage area to another. The projection of guidance indicia may be performed by a neighboring cell before a handoff occurs. For example, a long hall may traverse several small cells. Guidance indicia intended for viewing by a user who is at one end of the hall may be projected at an opposite end of the hall using projectors connected to a small cell base station other than the one with which the user's mobile device is connected. The operation of the system is coordinated through one or more mobile switching centers in the cellular communications network.

Conversely, due to obstructions, a user located within a small cell may not be visible to camera sensors controlled by the base station in that cell, but may be visible to a camera controlled by the base station of a neighboring cell. In such a case, the cellular communications network may coordinate the sharing of location information between the two involved cells.

The disclosed system may be exposed to third party application developers via an API to further expand functionality. The API may enable cooperative systems in which the cellular communications network interacts with other computer systems in delivering information to mobile device users.

For example, a methodology may be implemented for shopping in a grocery store. A user can select items for intended purchase using a mobile app installed on the user's mobile device. The app identifies the user to the system and the system determines the user's location in the store using information from the mobile device and/or using camera sensors in the store. The system then uses information delivery devices, such as projectors, to assist the user in navigating through the store to the item. The system may additionally use a laser pointer to highlight to the user the item's location of the item on a shelf. The presence of the item may be verified using a camera or by interfacing with an inventory system maintained by the store.

The disclosed solution permits a user to enjoy the benefits of augmented reality using a cellular communications network, without requiring the use of a mobile device for display. It improves the safety of individuals and groups while using augmented reality, and provides enhanced capabilities during emergencies.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method, comprising:
   by a first small cell telecommunications base station in a cellular telecommunications network, receiving from a first mobile device an identification of the first mobile device via a first low-range cellular communications transceiver; the first small cell telecommunications base station being in communication with a guidance information delivery device, the guidance information delivery device being visible to a user of the first mobile device without the user being required to view the first mobile device;
   by a second small cell telecommunications base station in the cellular telecommunications network, receiving from a second mobile device an identification of the second mobile device via a second low-range cellular communications transceiver;
   computing a location of a meeting point using a location of the first small cell telecommunications base station and a location of the second small cell telecommunications base station; and
   delivering guidance information to the user of the first mobile device to guide the user of the first mobile device to the meeting point, the guidance information being delivered via the guidance information delivery device without transmitting the guidance information through the first mobile device and without requiring the user of the first mobile device to view the first mobile device.

2. The method of claim 1, wherein the delivery device is a projector in communication with the first small cell telecommunications base station and positioned to project the guidance information on surfaces visible to the user of the first mobile device.

3. The method of claim 1 further comprising:
   determining a location of the user of the first mobile device within a first cellular coverage area of the first small cell telecommunications base station; and
   selecting the delivery device based on the location of the user of the first mobile device within the first cellular coverage area of the first small cell telecommunications base station.

4. The method of claim 3 wherein the determining the location of the user of the first mobile device within the first cellular coverage area of the first small cell telecommunications base station comprises interpreting images received from a camera positioned within the first cellular coverage area of the first small cell telecommunications base station, the camera being in communication with the first small cell telecommunications base station without communicating through the first mobile device.

5. The method of claim 3 wherein the determining the location of the user of the first mobile device within the first cellular coverage area of the first small cell telecommunications base station comprises receiving location data determined by a GPS receiver of the first mobile device.

6. The method of claim 3 wherein the determining the location of the user of the first mobile device within the first cellular coverage area of the first small cell telecommunications base station comprises receiving information on a signal strength of a signal received by the first small cell telecommunications base station from the first mobile device.

7. The method of claim 1, wherein the guidance information delivered to the user of the first mobile device is communicated to the delivery device by a third small cell telecommunications base station.

8. The method of claim 1, wherein the delivery device is an audio system.

9. The method of claim 1, wherein the delivery device is a device selected from a group consisting of a video display device, a laser pointer and an illumination light.

10. The method of claim 1 further comprising:
receiving customization information from the user of the first mobile device via a mobile app running on the first mobile device.

11. A cellular telecommunications network, comprising:
a processor;
a first small cell telecommunications base station in communication with the processor and in communication with a first mobile device via a first low-range cellular communications transceiver;
a guidance information delivery device in communication with the first small cell telecommunications base station, the guidance information delivery device being visible to a user of the first mobile device without the user being required to view the first mobile device;
a second small cell telecommunications base station in communication with the processor and in communication with a second mobile device via a second low-range cellular communications transceiver;
a memory device having stored thereon computer readable instructions that, when executed by the processor, cause the processor to perform the following operations:
receiving from the first small cell telecommunications base station an identification of the first mobile device;
receiving from the second small cell telecommunications base station an identification of the second mobile device;
computing a location of a meeting point using a location of the first small cell telecommunications base station and a location of the second small cell telecommunications base station; and
delivering guidance information to the user of the first mobile device to guide the user of the first mobile device to the meeting point, the guidance information being delivered via the guidance information delivery device without transmitting the guidance information through the first mobile device and without requiring the user of the first mobile device to view the first mobile device.

12. The cellular telecommunications network of claim 11, wherein the delivery device is a projector in communication with the processor and positioned to project the guidance information on surfaces visible to the user of the first mobile device.

13. The cellular telecommunications network of claim 11, wherein the information delivered to the user of the first mobile device is delivered via a third small cell telecommunications base station.

14. The cellular telecommunications network of claim 11, wherein the operations further comprise:
determining a location of the user of the first mobile device within a first cellular coverage area of the first small cell telecommunications base station; and
selecting the delivery device based on the location of the user of the first mobile device within the first cellular coverage area of the first small cell telecommunications base station.

15. The cellular telecommunications network of claim 14 wherein the determining the location of the user of the first mobile device within the first cellular coverage area of the first small cell telecommunications base station comprises interpreting images received from a camera positioned within the first cellular coverage area of the first small cell telecommunications base station, the camera being in communication with the first small cell telecommunications base station without communicating through the first mobile device.

16. The cellular telecommunications network of claim 14 wherein the determining the location of the user of the first mobile device within the first cellular coverage area of the first small cell telecommunications base station comprises receiving location data determined by a GPS receiver of the first mobile device.

17. The cellular telecommunications network of claim 14 wherein the determining the location of the user of the first mobile device within the first cellular coverage area of the first small cell telecommunications base station comprises receiving information on a signal strength of a signal received by the first small cell telecommunications base station from the first mobile device.

18. A non-transitory computer-readable medium having stored thereon computer readable instructions for guiding a mobile device user to a meeting point, wherein execution of the computer readable instructions by a processor causes the processor to perform operations comprising:
receiving from a first mobile device an identification of the first mobile device via a first low-range cellular communications transceiver;
receiving from a second mobile device an identification of the second mobile device via a second low-range cellular communications transceiver;
computing a location of the meeting point using a location of the first small cell telecommunications base station and a location of the second small cell telecommunications base station;
connecting to a guidance information delivery device, the guidance information delivery device being visible to a user of the first mobile device without the user being required to view the first mobile device; and
delivering guidance information to the user of the first mobile device to guide the user of the first mobile device to the meeting point, the guidance information being delivered to the user of the first mobile device via the guidance information delivery device without transmitting the guidance information through the first mobile device and without requiring the user of the first mobile device to view the first mobile device.

19. The non-transitory computer-readable medium of claim 18 wherein the operations further comprise:
  determining a location of the user of the first mobile device within a first cellular coverage area of the first small cell telecommunications base station; and
  selecting the delivery device based on the location of the user of the first mobile device within the first cellular coverage area of the first small cell telecommunications base station.

20. The non-transitory computer-readable medium of claim 19 wherein the determining the location of the user of the first mobile device within the first cellular coverage area of the first small cell telecommunications base station comprises interpreting images received from a camera positioned within the first cellular coverage area of the first small cell telecommunications base station, the camera being in communication with the first small cell telecommunications base station without communicating through the first mobile device.

\* \* \* \* \*